United States Patent [19]
Noll et al.

[11] Patent Number: 5,151,329
[45] Date of Patent: Sep. 29, 1992

[54] PROCESS FOR THE PRODUCTION OF PATENT LEATHER AND PATENT LEATHER PREPARED THEREFROM

[75] Inventors: Klaus Noll; Josef Pedain; Bruno Zorn, all of Koeln; Rosemarie Schmid, Leverkusen, all of Fed. Rep. of Germany

[73] Assignee: Bayer Aktiengesellschaft, Leverkusen, Fed. Rep. of Germany

[21] Appl. No.: 371,357

[22] Filed: Jun. 26, 1989

[30] Foreign Application Priority Data

Jul. 7, 1988 [DE] Fed. Rep. of Germany ....... 3823048

[51] Int. Cl.$^5$ .......................... B32B 9/02; B32B 27/40
[52] U.S. Cl. .................... 428/423.4; 427/389; 428/473; 528/79; 528/80; 528/83
[58] Field of Search ............... 428/473, 423.4; 427/389; 528/79, 80, 83

[56] References Cited

U.S. PATENT DOCUMENTS

| | | | |
|---|---|---|---|
| 3,245,827 | 4/1966 | Weber, Jr. | 428/473 |
| 4,334,033 | 7/1982 | Metzinger et al. | 528/66 |
| 4,400,498 | 8/1983 | Konishi et al. | 528/83 |
| 4,401,801 | 8/1983 | Pedain et al. | 528/83 |

*Primary Examiner*—Paul J. Thibodeau
*Assistant Examiner*—D. S. Nakarani
*Attorney, Agent, or Firm*—Joseph C. Gil; Thomas W. Roy

[57] ABSTRACT

The present invention is directed to a process for the production of high-gloss patent leather from two-component polyurethane compositions by reacting hydroxyl group-containing oligourethanes with polyisocyanates, characterized in that the oligourethanes have been synthesized from A) at least 2 macrodiols in a molar ratio of about 1:6 to 6:1 wherein
  1) the first macrodiol has an average molecular weight of 254 to about 650 and contains an aromatic ring or a saturated or unsaturated cycloaliphatic ring and
  2) the second macrodiol has an average molecular weight of about 1,200 to 3,000, provided that the molecular weight of macrodiol A/2 is at least 3 times the molecular weight of macrodiol A/1, and
B) at least one diisocyanate, wherein the macrodiol:diisocyanate molar ratio is about 1.0:0.9 to 1.0:0.3.

The present invention is also directed to the high-gloss patent leather prepared in accordance with the above process.

16 Claims, No Drawings

PROCESS FOR THE PRODUCTION OF PATENT LEATHER AND PATENT LEATHER PREPARED THEREFROM

BACKGROUND OF THE INVENTION

FIELD OF THE INVENTION

The present invention is directed to the preparation of high-gloss coatings for leather using two-component polyurethane coating compositions and to the high-gloss coatings prepared therefrom.

DESCRIPTION OF THE PRIOR ART

Two-component polyurethane coating compositions are known and have been used to produce high-gloss coatings on leather to be used for shoes and articles of clothing. This type of coating completely conseals the leather surface.

In order to produce patent leather from polyurethanes, polyester diol solutions, optionally containing dyes and other additives, are mixed with polyisocyanate solutions, and the coating composition mixed in this way is applied to bottomed leather. The application can take place by spraying, casting, plushing, etc. The final coating is then produced over the course of several hours through a reaction of the isocyanate and hydroxyl groups. It is distinguished by good solvent resistance, resistance to cracking, elasticity, scratch resistance and, in particular, very high gloss.

The hydroxypolyesters used are generally synthesized from aliphatic dicarboxylic acids and difunctional alcohols, in some cases using components to provide branching such as trimethylolpropane. The molecular weights of these esters are about 2,000. The polyisocyanates are generally derived from aromatic diisocyanates and are obtained by adduct formation with low molecular weight polyols or by trimerization. The two components are preferably dissolved in low-boiling solvents.

The coated materials are subjected to high stresses, particularly during the production of shoes. The leathers are permanently set under the influence of heat in the thermosetting process, during which time the patent leather suffers from folds and, in some cases, cracks.

An object of the present invention is to produce patent leather having excellent "thermosetting" properties.

The object may be achieved by using specific hydroxyl group-containing oligourethanes as the hydroxyl component in place of the known hydroxypolyesters.

SUMMARY OF THE INVENTION

The present invention is directed to a process for the production of high-gloss patent leather from two-component polyurethane compositions by reacting hydroxyl group-containing oligourethanes with polyisocyanates, characterized in that the oligourethanes have been synthesized from A) at least 2 macrodiols in a molar ratio of about 1:6 to 6:1 wherein
1) the first macrodiol has an average molecular weight of 254 to about 650 and contains an aromatic ring or a saturated or unsaturated cycloaliphatic ring,
2) the second macrodiol has an average molecular weight of about 1,200 to 3,000, provided that the molecular weight of macrodiol A/2 is at least 3 times the molecular weight of macrodiol A/1, and B) at least one diisocyanate, wherein the macrodiol:diisocyanate molar ratio is about 1.0:0.9 to 1.0:0.3.

The present invention is also directed to the high-gloss patent leather prepared in accordance with the above process.

DETAILED DESCRIPTION OF THE INVENTION

The molar ratio between the macrodiols is preferably about 1:3 to 3:1, and the macrodiol:diisocyanate molar ratio is preferably about 1.0:0.7 to 1.0:0.4.

The relatively short-chain macrodiols containing a 6-membered ring (such as an aromatic ring or a saturated or unsaturated cycloaliphatic ring) and having an average molecular weight of 254 to about 650 are selected from polyethers, polyesters or polycarbonates. According to the invention, the short-chain macrodiols must contain at least one aromatic ring (preferably a benzene ring), cycloaliphatic ring (preferably a cyclohexane ring) or unsaturated ring (preferably a cyclohexene ring). The short-chain macrodiols have a hydroxyl functionality of about 1.8 to 2.2, preferably about 1.95 to 2.05, and are thus essentially difunctional. The polyethers which may be used according to the invention as the short-chain macrodiol contain cyclic substances, preferably bisphenols, as the initiator molecule. Examples of these initiators include hydroquinone, resorcinol and preferably 4,4'-dihydroxy-diphenylpropane. Propylene oxide, ethylene oxide, butylene oxide, styrene oxide and/or epichlorohydrin can be adducted individually, in mixtures or in sequence to the initiator molecules to form polyethers containing OH end groups. Preferably at least one hydroxyether group should have been adducted to each reactive group (for example OH) of the initiator molecule. Preferred polyethers are those initiated with 4,4'-dihydroxy-diphenylpropane. Particularly preferred polyethers are those having a molecular weight of about 350 to 600 wherein propylene oxide has been adducted onto 4,4'-dihydroxy-diphenylpropane.

Suitable polyesters are those which are synthesized from cyclic carboxylic acids such as phthalic acid, phthalic anhydride, isophthalic acid, terephthalic acid, hexahydrophthalic acid, tetrahydrophthalic acid and hexahydroterephthalic acid. Polyesters based on these acids are preferably employed. However, the additional acids mentioned hereinafter for the preparation of polyesters (2) can likewise be used for the modification. Polyesters based on ethylene glycol and phthalic acid and having a molecular weight of about 350 to 600 are particularly preferred.

Suitable polycarbonates containing hydroxyl groups include those which are based on cyclic diols such as 1,4-hydroquinone bishydroxyethyl ether or 4,4'-diphenylpropane bishydroxypropyl ether. Particularly preferred polycarbonates are those based on 1,4-dimethylol-cyclohexane and having a molecular weight of about 350 to 600.

The macrodiols (2) have an average molecular weight of about 1,200 to 3,000 and are selected form polyethers, polyesters and polycarbonates having the same average hydroxyl functionality as macrodiols (1). Suitable polyethers containing hydroxyl groups which are suitable for use in accordance with the present invention are known and prepared, for example, by the polymerization of cyclic ethers (such as ethylene oxide, propylene oxide, butylene oxide, tetrahydrofuran, styrene oxide or epichlorohydrin) with themselves, for example in the presence of BF₃, or by the addition of these compounds, either in admixture or successively, onto initiators containing reactive hydrogen atoms such as alcohols and amines. Examples include water, ethylene glycol, 1,2- or 1,3-propylene glycol and 4,4'-dihydroxy-diphenylpropane.

Suitable polycarbonates containing hydroxyl groups are known and include those which can be prepared, for example, by reacting diols (such as 1,3-propanediol, 1,4-butanediol, 1,6-hexanediol, diethylene glycol, triethylene glycol and/or tetraethylene glycol) with phosgene or diaryl carbonates such as diphenyl carbonate. Preferred polycarbonates are those based on 1,6-hexanediol and, optionally, minor amounts (about 5 to 35 mole %, based on the diols) of other diols such as 1,4-butanediol or diethylene glycol. Polycarbonates based on $HO-(CH_2)_6-O-CO-(CH_2)_5-OH$ are also suitable.

Suitable polyesters containing hydroxyl groups include reaction products of polyhydric, preferably dihydric alcohols to which trihydric alcohols may be added, with polybasic, preferably dibasic carboxylic acids. In place of the free polycarboxylic acids, it is also possible to use the corresponding polycarboxylic acid anhydrides or esters of lower alcohols or mixtures thereof to prepare the polyesters. The polycarboxylic acids may be aliphatic, cycloaliphatic, aromatic and/or heterocyclic and may optionally be unsaturated or substituted, for example, by halogen atoms.

Suitable polycarboxylic acids include adipic acid, succinic acid, suberic acid, azelaic acid, sebacic acid, phthalic acid, isophthalic acid, phthalic acid anhydride, tetrahydrophthalic acid anhydride, hexahydrophthalic acid anhydride, maleic acid anhydride.

The diisocyanates which are preferably used for the preparation of the hydroxyl group-containing oligourethanes are aromatic diisocyanates such as 2,4- and/or 2,6-toluylene diisocyanate, diphenylmethane 2,4'-, 4,4'- and/or 2,2'-diisocyanate and symmetrical or asymmetrical mono- to tetraalkyl-substituted $C_1$-$C_4$-alkyl-diphenylmethane diisocyanates. However, it is also possible to employ aliphatic and/or cycloaliphatic diisocyanates such as 1,4-tetramethylene diisocyanate, 1,6-hexamethylene diisocyanate, 1,12-dodecane diisocyanate, 1-isocyanato-3,3,5-trimethyl-5-isocyanatomethyl-cyclohexane, 4,4'-diisocyanato dicyclohexylmethane, cyclobutane 1,3-diisocyanate, cyclohexane 1,3- and 1,4-diisocyanate, 1,4-bis-isocyanatomethyl-cyclohexane, 2,4- and 2,6-hexahydro-toluylene diisocyanate, hexahydro-1,3- and/or -1,4-xylylene diisocyanate, 2,4'- and 2,2'-dicyclohexylmethane diisocyanate and any mixtures of the positional isomers and/or stereo-isomers of the cycloaliphatic diisocyanates.

The reaction of the macrodiols with the diisocyanates is carried out at temperatures of about 60°-120° C., preferably with the aid of an inert solvent such as toluene, xylene, ethyl acetate, butyl acetate, methyl and ethyl glycol acetate, 1- and 2-methoxypropyl acetate, acetone, methyl ethyl ketone, methyl isobutyl ketone and tetrahydrofuran. The reaction is complete when free isocyanate groups can no longer be detected by IR spectroscopy.

The solutions are preferably employed in concentrated form, i.e., they have a solids content of greater than 50%, preferably greater than 70%. The viscosity should be about 5,000-20,000 mPas. This makes possible the formation of ready-to-process coating compositions having a high solids content. The use of these coating compositions results in reduced pollution of the environment by solvents and allows for high-density coatings to be applied by a one-coat process.

The hydroxyoligourethanes according to the invention are processed by the processes outlined in detail in "Tanning, Dyeing, Finishing", 4th ed. (Nov. 1986), p. 212 (Bayer AG) or "Das Leder" 4, 10, p. 234 ff (1953) with addition of polyisocyanates, to form ready-to-use coating materials. Coating materials of this type naturally only have a limited pot life, but processing is generally possible for at least eight hours. The polyisocyanates are preferably aromatic in nature and may be added as such or diluted with solvents which are non-reactive to isocyanate groups. Their functionality is preferably around 3 and they are formed by reacting diisocyanate monomers with trifunctional polyols such as trimethylolpropane or glycerol or with themselves to form isocyanurate ring containing derivatives. The diisocyanates used to obtain the polyisocyanates are identical with those mentioned on page 5. Application is preferably carried out by spraying or pouring. In either case, suitable additives such as catalysts, flow control agents and also solvents can be added In order to achieve the processing viscosity desired.

The invention is further illustrated but is not intended to be limited by the following examples in which all parts and percentages are by weight unless otherwise specified.

EXAMPLES

Example 1

A) 192 parts of a polyester prepared from ethylene glycol and phthalic anhydride and having an OH number of 195, and 1,872 parts of a polyester prepared from diethylene glycol and adipic acid and having an OH number of 43 were mixed and dissolved in 276 parts of 1-methoxypropyl-2-acetate. 139 parts of 2,4-diisocyanattoluene were added to this solution. The temperature was slowly increased to 80° C. and the mixture was stirred until no NCO groups could be detected by IR spectroscopy. Towards the end of the reaction, 276 parts of ethyl acetate were slowly added in increments. The resultant solution had a solids content of 80% and a viscosity of 16,000 mPas/23° C.

B) 1,000 parts of this solution were mixed with 630 parts of a polyisocyanate solution having a solids content of 67% and prepared from 2,4-diisocyanattoluene, trimethylolpropane and diethylene glycol (molar ratio of alcohols 6:4) in xylene/butyl acetate 1:1 (NCO content of the solution about 12%). The mixture was diluted with 700 parts of a mixture of methyl ethyl ketone and cyclohexanone in a weight ratio of 7:3. The solution had a solids content of 49% and a viscosity of 30 seconds (Ford cup, 4 mm nozzle).

Using the pouring process described on page 5, lines 32-35 a coating of about 90 g/m² of solids was applied to a buffed, bottomed leather. After drying for 8 hours at 60° C., a patent leather was produced which had good gloss and fullness.

C) The thermosetting properties were measured by the method of W. Fischer and W. Schmidt, "Leder-und Hautemarkt" 22 (1970), 3, pp. 1-6, using the following experimental arrangement:

The heat distortion was maintained for 3 at 120° C. at an elongation of 30% using the hand lastometer from Messrs. Ring Mechanische Werkstatten, Pirmasens (in accordance with DIN 53 325), and the coating surface was assessed in accordance with the following scale:
1: no flaws
2: appearance of folds
3: appearance of folds and small cracks
4: large-scale cracking These results are summarized in Table 1 below.

EXAMPLE 2 (COMPARATIVE EXAMPLE)

A coating material was prepared from the following components and processed in accordance with the procedure of

EXAMPLE 1B 1,000 parts of a polyester prepared from adipic acid and diethylene glycol and trimethylolpropane (molar ratio of alcohols 94:6) and having an OH number of 60, 850 parts of the polyisocyanate described in Example 1B, and 1,000 parts of a 1:1 mixture of ethyl acetate and butyl acetate.

The coating composition had a solids content of 51.5% and a viscosity of 25 seconds. (Ford Cup, 4 mm nozzle).

The result of the test in accordance with Example 1C is also shown in Table 1 below.

EXAMPLES 3-8

The hydroxyl group-containing oligourethanes of these examples were prepared by the procedure of Example 1A. Their compositions are summarized in Table 2.

TABLE 1

| Example | 1 | 2[1] | 3[1] | 4[1] | 5 | 6[1] | 7 | 8 |
|---|---|---|---|---|---|---|---|---|
| Theremosetting[2] | 1 | 4 | 3 | 3 | 1 | 4 | 1-2 | 1-2 |

[1]Comparative Example
[2]see Example 1C

TABLE 2

| | Example | | | | | |
|---|---|---|---|---|---|---|
| | 3 | 4 | 5 | 6 | 7 | 8 |
| OLIGOURETHANE | | | | | | |
| Polyester | A | A | A/C 1.2/1.8 | B | B/C/D 1/0.77/1.23 | D/E 1.8/1.2 |
| Diisocyanate | MDI | MDI | TDI | TDI | TDI | TDI |
| moles of PE:DI | 3:2 | 2:1 | 3:2 | 3:2 | 3:2 | 3:2 |
| solvent | BuAc | BuAC | EE | EE | EE | EE/MPA 1/1 |
| Conc. (%) | 80 | 80 | 80 | 80 | 80 | 80 |
| Visc. (mPas) | 25000 | 3800 | 10000 | 33000 | 22000 | 16000 |
| PATENT LEATHER | | | | | | |
| Oligourethane | 1000 | 1000 | 1000 | 1000 | 1000 | 1000 |
| Polyisocyanate | 650 | 600 | 650 | 650 | 650 | 650 |
| Diluent[1] | 800 | 800 | 800 | 800 | 800 | 800 |
| Conc. (%) | 50.4 | 49.6 | 50.4 | 50.4 | 50.4 | 50.4 |
| Visc. (sec) | 30 | 15 | 35 | 25 | 35 | 25 |

A: Polyester made from adipic acid, hexanediol/neopentyl glycol (molar ratio 65:35), OH number: 66
B: Polyester made from adipic acid/phthalic acid, ethylene glycol, (molar ratio adipic acid:phthalic acid:ethylene glykol = 49:51:118, OH number: 64
C: Polyester made from phthalic acid, ethylene glycol, as in Example 1A
D: Polyester made from adipic acid, diethylene glycol, as in Example 1A
E: Polyester made from phthalic anhydride, diethylene glycol (molar ratio 1/0.8), extended to form a polyether using ethylene oxide, OH number: 309
MDI: 4,4'-diisocyanatodiphenylmethane
TDI: 2,4- and 2,6-diisocyanatotoluene (molar ratio 65:35)
BuAc: Butyl acetate
EE: Ethyl acetate
MPA: 1-methoxypropyl-2-acetate
[1]Methyl ethyl ketone/cyclohexanone 7:3

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a high-gloss patent leather which comprises applying to a leather substrate a reactive mixture of a polyisocyanate with a hydroxyl group-containing oligourethane which comprises the reaction product of
   A) 1) at least one macrodiol having an average molecular weight of 254 to about 650 and comprising a member selected from the group consisting of an aromatic ring, a saturated cycloaliphatic ring and an unsaturated cycloaliphatic ring and
   2) at least one macrodiol having an average molecular weight of about 1,200 to 3,000, provided that the molecular weight of macrodiol A/2 is at least 3 times the molecular weight of macrodiol A/1,
   wherein macrodiols A/1 and A/2 are present in a molar ratio of about 1:6 to 6:1 with
   B) at least one diisocyanate,
   wherein the macrodiol A:diisocyanate B molar ratio is about 1.0:0.9 to 1.0:0.3.

2. The process of claim 1 wherein the macrodiol A:diisocyanate B molar ratio is about 1.0:0.7 to 1.0:0.4.

3. The process of claim 1 wherein macrodiols A/1 and A/2 are present in a molar ratio of about 1:3 to 3:1.

4. The process of claim 2 wherein macrodiols A/1 and A/2 are present in a molar ratio of about 1:3 to 3:1.

5. The process of claim 1 wherein macrodiol A/1 has an average molecular weight of about 350 to 600.

6. The process of claim 2 wherein macrodiol A/1 has an average molecular weight of about 350 to 600.

7. The process of claim 3 wherein macrodiol A/1 has an average molecular weight of about 350 to 600.

8. The process of claim 4 wherein macrodiol A/1 has an average molecular weight of about 350 to 600.

9. A high gloss patent leather which is prepared by a process which comprises applying to a leather substrate a reactive mixture of a polyisocyanate with a hydroxyl group-containing oligourethane which comprises the reaction product of A) 1) at least one macrodiol having an average molecular weight of 254 to 650 and comprising a member selected from the group consisting of an aromatic ring, a saturated cycloaliphatic ring and an unsaturated cycloaliphatic ring and 2) at least one macrodiol having an average molecular weight of about 1,200 to 3,000, provided that the molecular weight of macrodiol A/2 is at least 3 times the molecular weight of macrodiol A/1, wherein macrodiols A/1 and A/2 are present in a molar ratio of about 1:6 to 6:1 with B) at least one diisocyanate, wherein the macrodiol A:diisocyanate B molar ratio is about 1.0:0.9 to 1.0:0.3.

10. The patent leather of claim 9 wherein the macrodiol A:diisocyanate B molar ratio is about 1.0:0.7 to 1.0:0.4.

11. The patent leather of claim 9 wherein macrodiols A/1 and A/2 are present in a molar ratio of about 1:3 to 3:1.

12. The patent leather of claim 10 wherein macrodiols A/1 and A/2 are present in a molar ratio of about 1:3 to 3:1.

13. The patent leather of claim 9 wherein macrodiol A/1 has an average molecular weight of about 350 to 600.

14. The patent leather of claim 10 wherein macrodiol A/1 has an average molecular weight of about 350 to 600.

15. The patent leather of claim 11 wherein macrodiol A/1 has an average molecular weight of about 350 to 600.

16. The patent leather of claim 12 wherein macrodiol A/1 has an average molecular weight of about 350 to 600.

* * * * *